US010683049B2

(12) United States Patent
Matsushima et al.

(10) Patent No.: US 10,683,049 B2
(45) Date of Patent: Jun. 16, 2020

(54) RESIN PART FOR VEHICLE

(71) Applicant: HONDA MOTOR CO., LTD., Minato-ku, Tokyo (JP)

(72) Inventors: Satoshi Matsushima, Wako (JP); Takeshi Ohara, Wako (JP); Yusuke Nagashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/224,950

(22) Filed: Dec. 19, 2018

(65) Prior Publication Data

US 2019/0202515 A1    Jul. 4, 2019

(30) Foreign Application Priority Data

Dec. 28, 2017  (JP) .................. 2017-254929

(51) Int. Cl.
| B62J 15/04 | (2006.01) |
| B62J 15/00 | (2006.01) |
| B29C 70/06 | (2006.01) |
| B29C 70/68 | (2006.01) |
| B29L 31/30 | (2006.01) |

(52) U.S. Cl.
CPC .............. B62J 15/04 (2013.01); B29C 70/06 (2013.01); B29C 70/68 (2013.01); B62J 15/00 (2013.01); *B29L 2031/3002* (2013.01)

(58) Field of Classification Search
CPC ........... B62J 17/00–08; B62J 15/00–04; B29C 70/68; B29L 2031/30; B29K 2105/06
See application file for complete search history.

(56) References Cited

U.S. PATENT DOCUMENTS

| 2011/0076441 A1* | 3/2011 | Gruenert ................. B29B 15/12 |
| | | 428/113 |
| 2016/0264082 A1* | 9/2016 | Berger .................... B60R 19/03 |

FOREIGN PATENT DOCUMENTS

| DE | 102016104154 | 9/2016 |
| EP | 2301735 | 3/2011 |
| EP | 2998102 | 3/2016 |
| JP | 2015-093479 | 5/2015 |
| JP | 2018-118704 | 8/2018 |
| WO | 2017115716 | 7/2017 |

OTHER PUBLICATIONS

Extended European Search Report for European Patent Application No. 18214496.4 dated Jun. 5, 2019.
Japanese Office Action for Japanese Patent Application No. 2017-254929 dated Oct. 1, 2019.

* cited by examiner

*Primary Examiner* — Erez Gurari
(74) *Attorney, Agent, or Firm* — Amin, Turocy & Watson, LLP

(57) ABSTRACT

A resin part for a vehicle includes a fender main body formed of a fiber-reinforced resin using a resin fiber, and a resin structure section formed of the same resin material as the resin fiber, provided at least on an outer surface of the resin part main body exposed on an outer side of a vehicle, and formed integrally with the resin part main body.

5 Claims, 14 Drawing Sheets

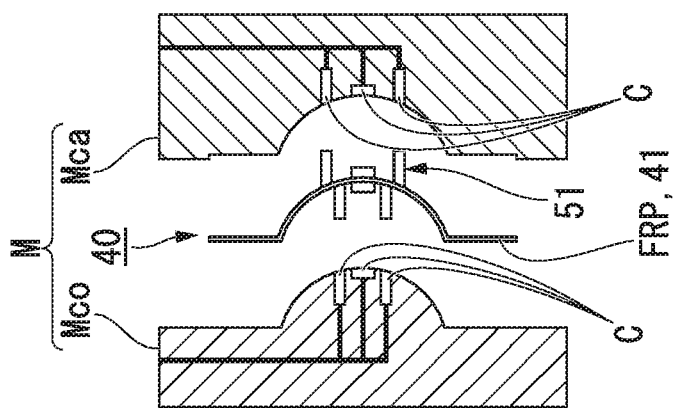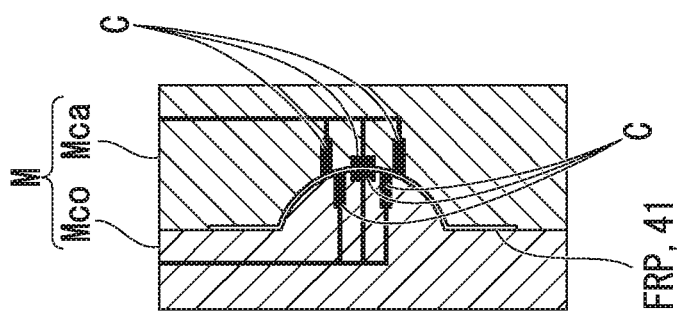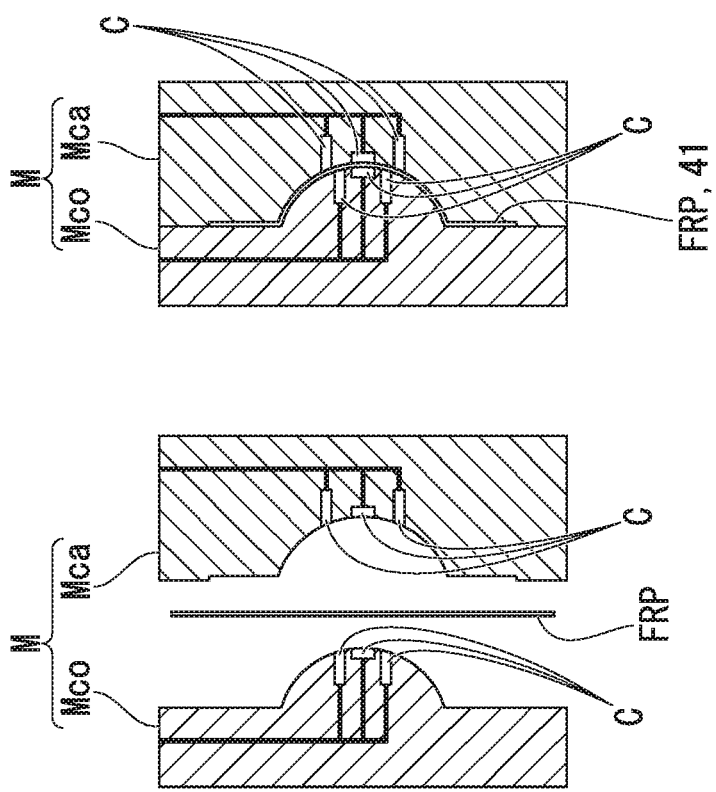

RESIN PART FOR VEHICLE

CROSS-REFERENCE TO RELATED APPLICATION

Priority is claimed on Japanese Patent Application No. 2017-254929, filed Dec. 28, 2017, the content of which is incorporated herein by reference.

BACKGROUND OF THE INVENTION

Field of the Invention

The present invention relates to a resin part for a vehicle.

Description of Related Art

PCT International Publication No. 2017/115716 discloses that a reinforcement rib formed of a resin is formed on a back surface (a surface facing a tire) of a mud guard (a rear fender) formed of a fiber-reinforced resin. A fiber-reinforced resin in which a fiber material such as carbon, glass, kevlar, and so on, is solidified with a resin such as polyamide or the like is exemplified as a material of a rear fender main body. In addition, a resin in which no fiber is included is exemplified as a material for a reinforcement rib.

SUMMARY OF THE INVENTION

By the way, in order to enhance the protective functions of a resin part for a vehicle including a rear fender which protects a host vehicle and others when coming into contact with the other bodies, it is required to make the rigidity compatible with the flexibility at high levels, while securing attachment rigidity with respect to a vehicle body. In addition, variation in appearance is required when using a fiber-reinforced resin.

An aspect of the present invention is intended to provide a resin part for a vehicle utilizing a fiber-reinforced resin at which a degree of freedom in setting the rigidity and flexibility is improved and a novel appearance is obtained.

(1) A resin part for a vehicle according to an aspect of the present invention includes a resin part main body formed of a fiber-reinforced resin utilizing a resin fiber; and a resin structure section formed of the same resin material as the resin fiber, provided at least on an outer surface of the resin part main body exposed on an outer side with respect to a vehicle, and formed integrally with the resin part main body.

According to this configuration of the aspect of above mentioned (1), since the reinforcing fiber included in the resin part main body and the resin material of the resin structure section formed integrally with the resin part main body are the same material as each other or materials able to melt into each other, in comparison with the case in which different materials or at least one material which does not melt is used, a strength of bonding of the resin structure section to the resin part main body can be increased. In addition, since the resin part main body that is a matrix is configured using the fiber material formed of a resin, in comparison with the case in which a conventional fiber material formed of carbon or the like is used, the matrix is easily deflected even while high rigidity is obtained, and a protective function can be provided while enabling shock absorption. In addition, since the resin structure section is provided on the outer surface exposed to an outer side with respect to the vehicle, the resin structure section is also able to be used for the design, and the design can thus be enhanced.

(2) In the aspect of above mentioned (1), the resin part main body may be formed of the fiber-reinforced resin having a matrix resin that has a melting point lower than that of the resin fiber.

According to this configuration of the aspect of above mentioned (2), since the resin part main body has the matrix resin having a melting point that is lower than that of the resin fiber, the matrix resin is easily melted upon joining to the resin structure section, and a strength of bonding can be increased.

(3) In the aspect of above mentioned (1) or (2), the resin structure section may be formed to protrude from the outer surface of the resin part main body toward an outer side with respect to the vehicle.

According to this configuration of the aspect above mentioned (3), since the resin structure section is formed to protrude outwards from the resin part main body, a degree of freedom in design of the resin part can be increased while a section modulus of the resin part is increased and rigidity of the resin part is enhanced. That is, since delamination of the resin structure section is prevented due to the strength of bonding between the resin materials, a resin structure section for a design can be formed on an outer surface which is easily influenced by disturbances, and novel designs including the resin structure section can be obtained.

(4) In the aspect according to any one of above mentioned (1) to (3), the resin structure section may include a reinforcement section extending in a direction crossing with respect to an orientation direction of the resin fiber of the resin part main body.

According to this configuration of the aspect above mentioned (4), by providing the reinforcing sections extending in order to compensate for the anisotropy of the resin fibers, it is possible to improve the rigidity of the resin part without increasing the number of laminated fiber sheets. When press-molding the resin part main body, compared with a case in which increasing the number of laminated fiber sheets, it is easier to heat uniformly during hot pressing, and the formability can be enhanced.

(5) In the aspect of above mentioned (4), the reinforcement section may extend from a vehicle body attachment section of the resin part main body to an end portion opposite to the vehicle body attachment section, and a protrusion height of the reinforcement section from the resin part main body may gradually decrease toward the end portion when seen in a side view.

According to the aspect of above mentioned (5), since the reinforcement section extends from the vehicle body attachment section of the resin part main body to the end portion opposite to the vehicle body attachment section, in comparison with the case in which the reinforcement section is terminated halfway, occurrence of stress concentration at the terminal position of the reinforcement section can be minimized Rigidity is secured by a protrusion height of the reinforcement section on a base end side (a vehicle body attachment section side) at which stress tends to occur, and reduction in weight can be achieved by lowering the reinforcement section on an end side at which stress does not tend to occur in comparison with the base end side.

(6) In the aspect of any one of above mentioned (1) to (5), the resin structure section may include an outer reinforcement section formed to protrude from the resin part main body toward an outer side in the vehicle, and an inner reinforcement section formed to protrude from the resin part main body toward an inner side in the vehicle, and the outer reinforcement section and the inner reinforcement section may be formed so as to face each other with a part of the resin part main body being interposed therebetween in a thickness direction of the resin part main body.

According to this configuration of the aspect of above mentioned (6), since the outer reinforcement section can be formed at a place of generation of sink marks (recesses generated on a surface according to contraction of the resin) that tends to occur on the other side (an outer side) when the reinforcement section (the inner reinforcement section) is formed at one side of the resin part main body, a design can be improved because the sink marks cannot be easily seen.

(7) In the aspect of any one of above mentioned (1) to (6), a part attachment section formed of the same resin material as the resin fiber, continuous with the resin structure section and formed integrally with the resin part main body may be provided.

According to this configuration of the aspect of above mentioned (7), since the part attachment section is formed integrally with the resin structure section, the part attachment section is easily molded, and since the part attachment section is not provided with fibers, fibers are not exposed even influenced during attachment of parts or by disturbances, and it is possible to prevent the resin fibers from hindering attachment of parts while improving an appearance.

According to the aspect of the present invention, in the resin part for a vehicle using the fiber-reinforced resin, a degree of freedom in setting of rigidity and flexibility can be improved, and novel appearance can be obtained.

BRIEF DESCRIPTION OF THE DRAWINGS

FIG. 13A is a view for explaining a process of manufacturing the rear fender.

FIG. 13B is a view for explaining a process of manufacturing the rear fender.

FIG. 13C is a view for explaining a process of manufacturing the rear fender.

FIG. 13D is a view for explaining a process of manufacturing the rear fender.

DETAILED DESCRIPTION OF THE INVENTION

Figure 1:
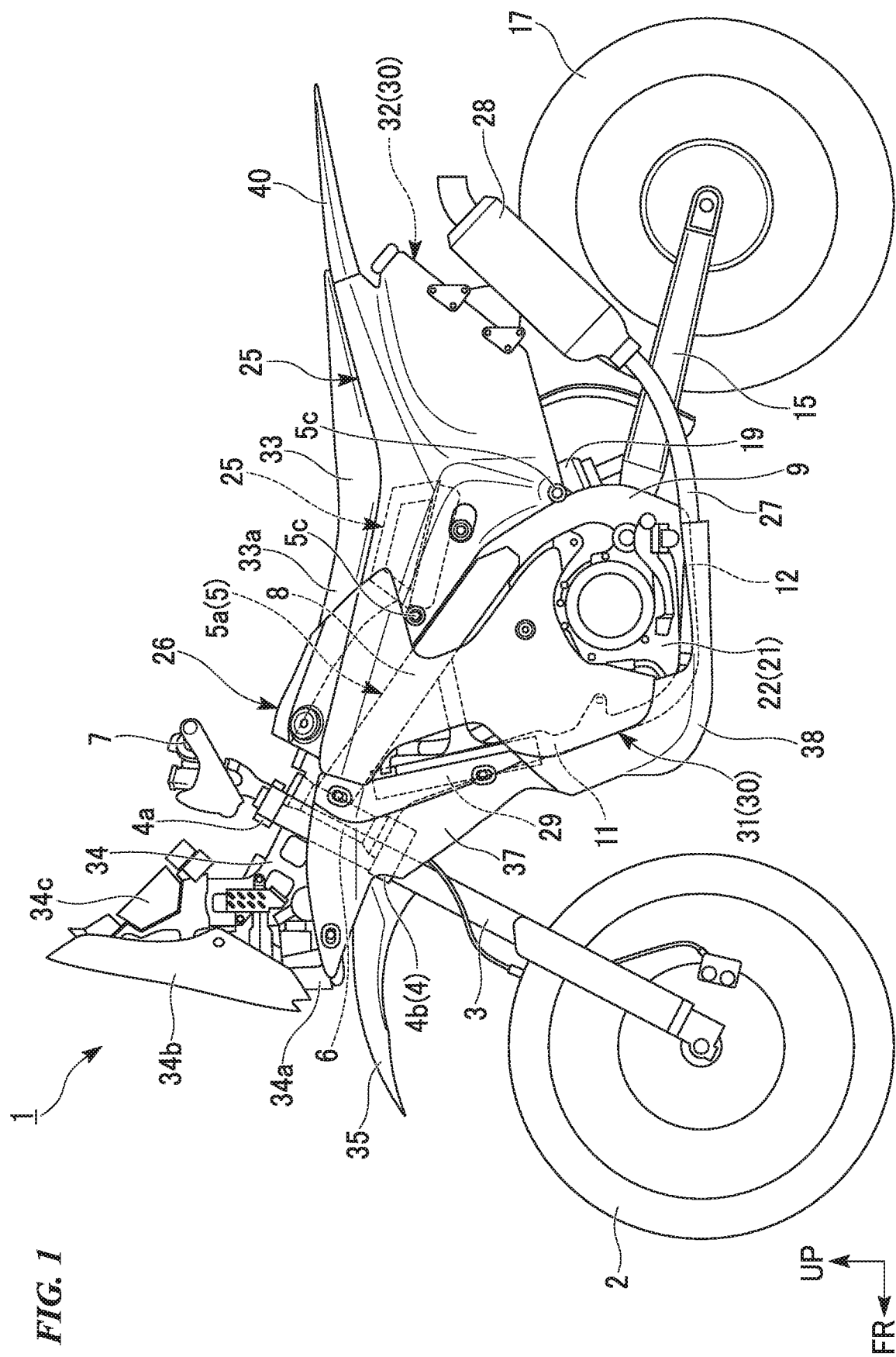
FIG. 1 is a left side view of a motorcycle according to an embodiment of the present invention.
Figure 2:
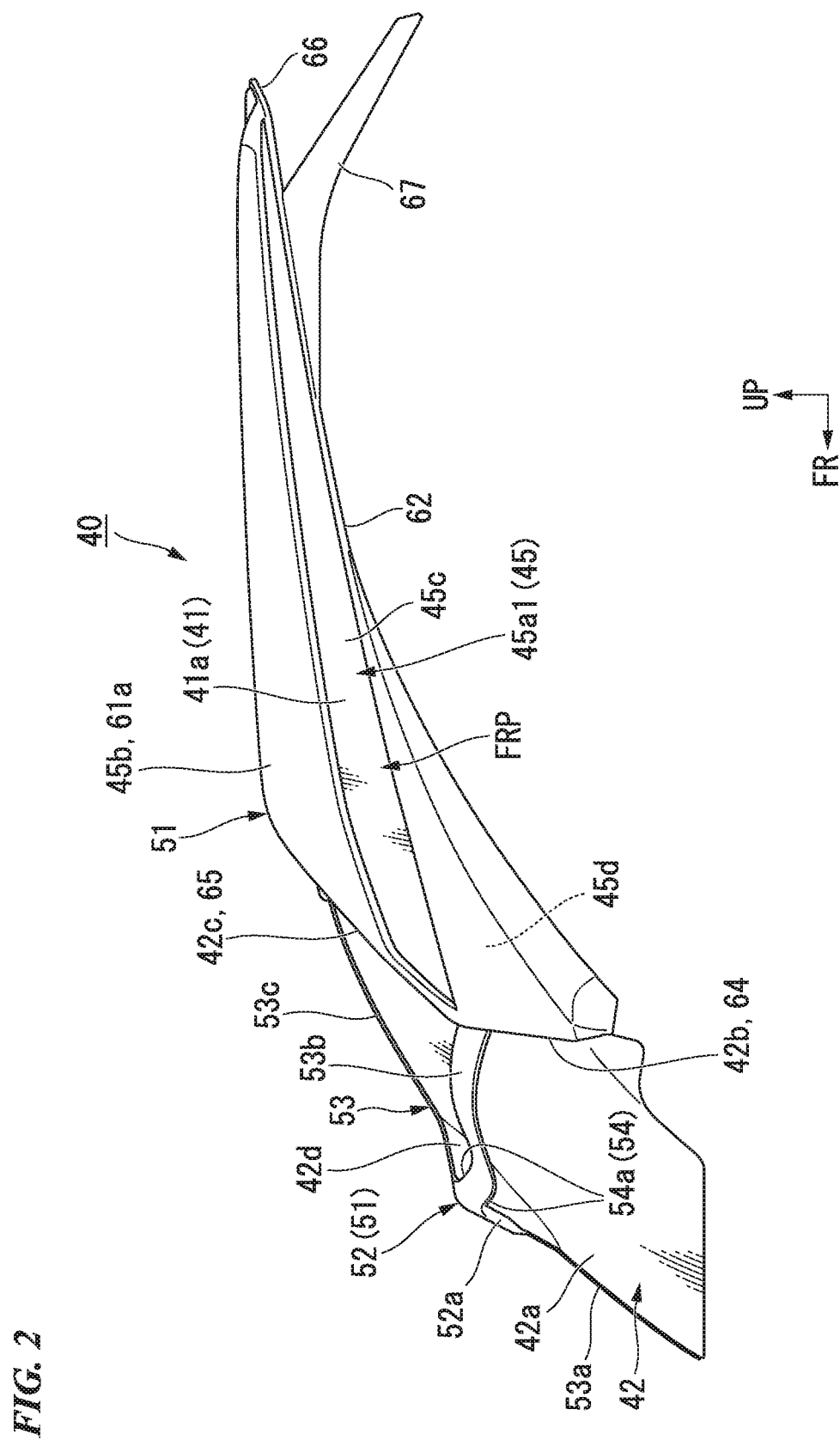
FIG. 2 is a left side view of a rear fender of the motorcycle.
Figure 3:
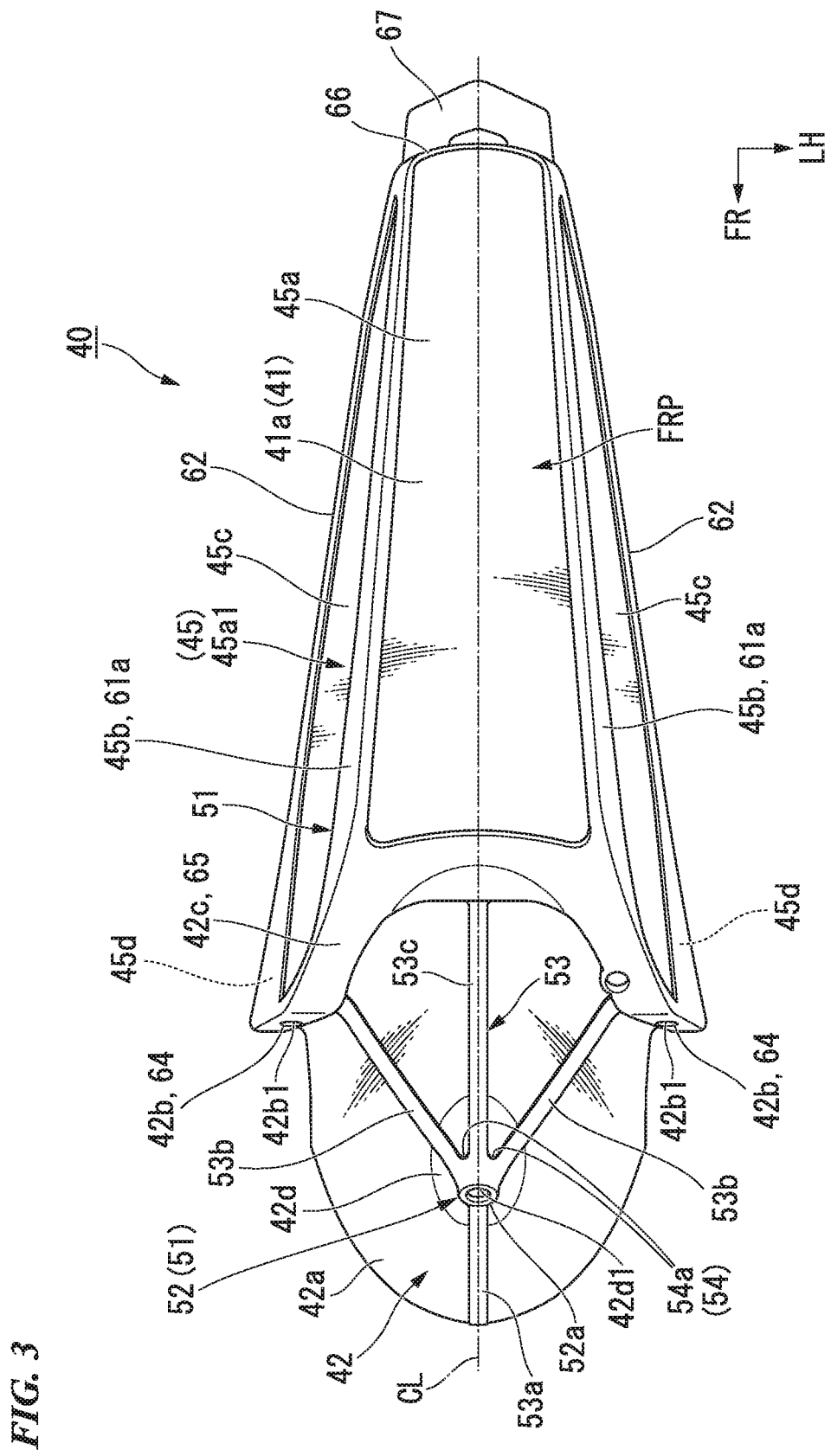
FIG. 3 is a top view of the rear fender.
Figure 4:
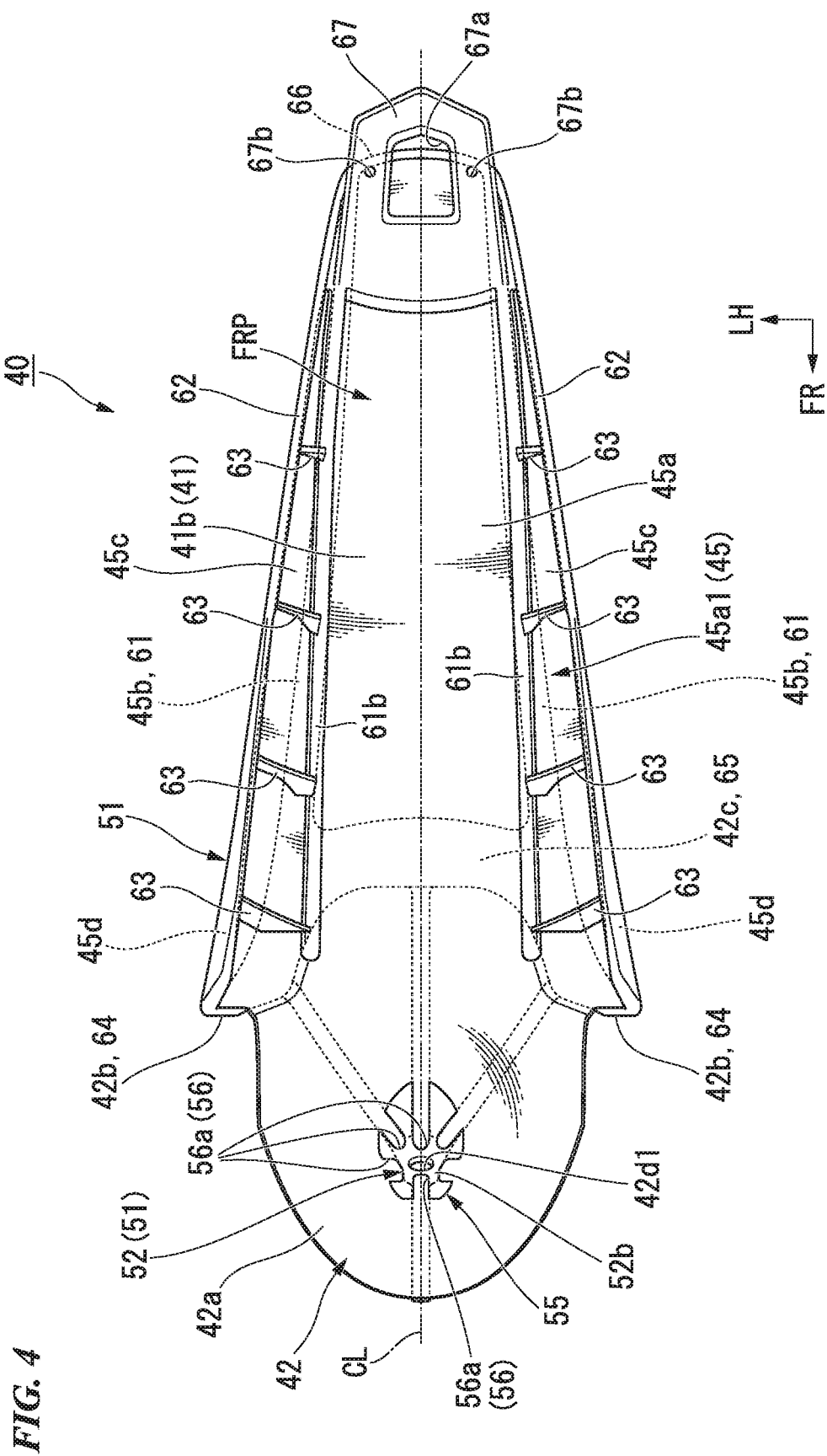
FIG. 4 is a bottom view of the rear fender.
Figure 5:
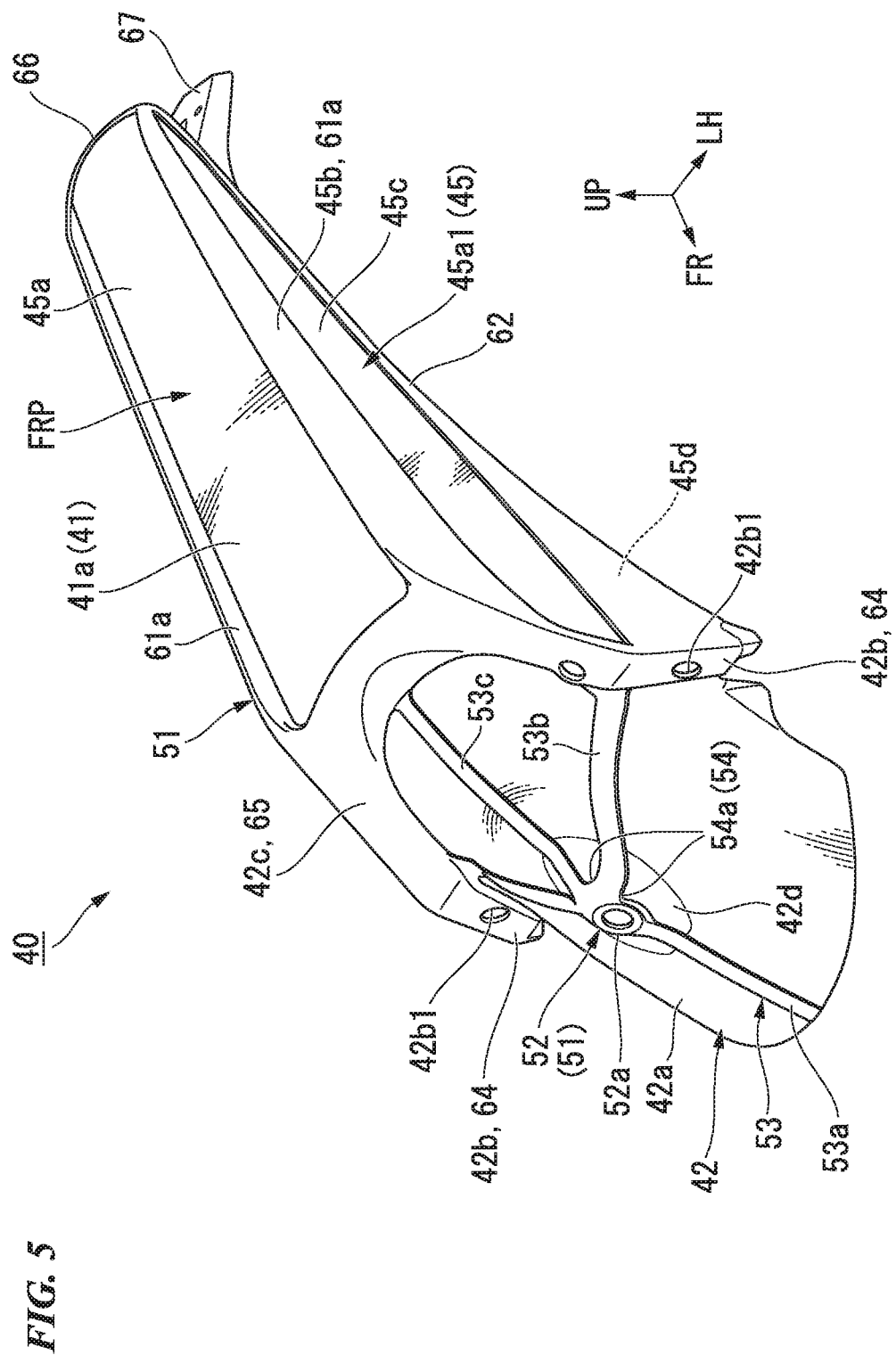
FIG. 5 is a perspective view of the rear fender when seen from an inclined front upper side.
Figure 6:
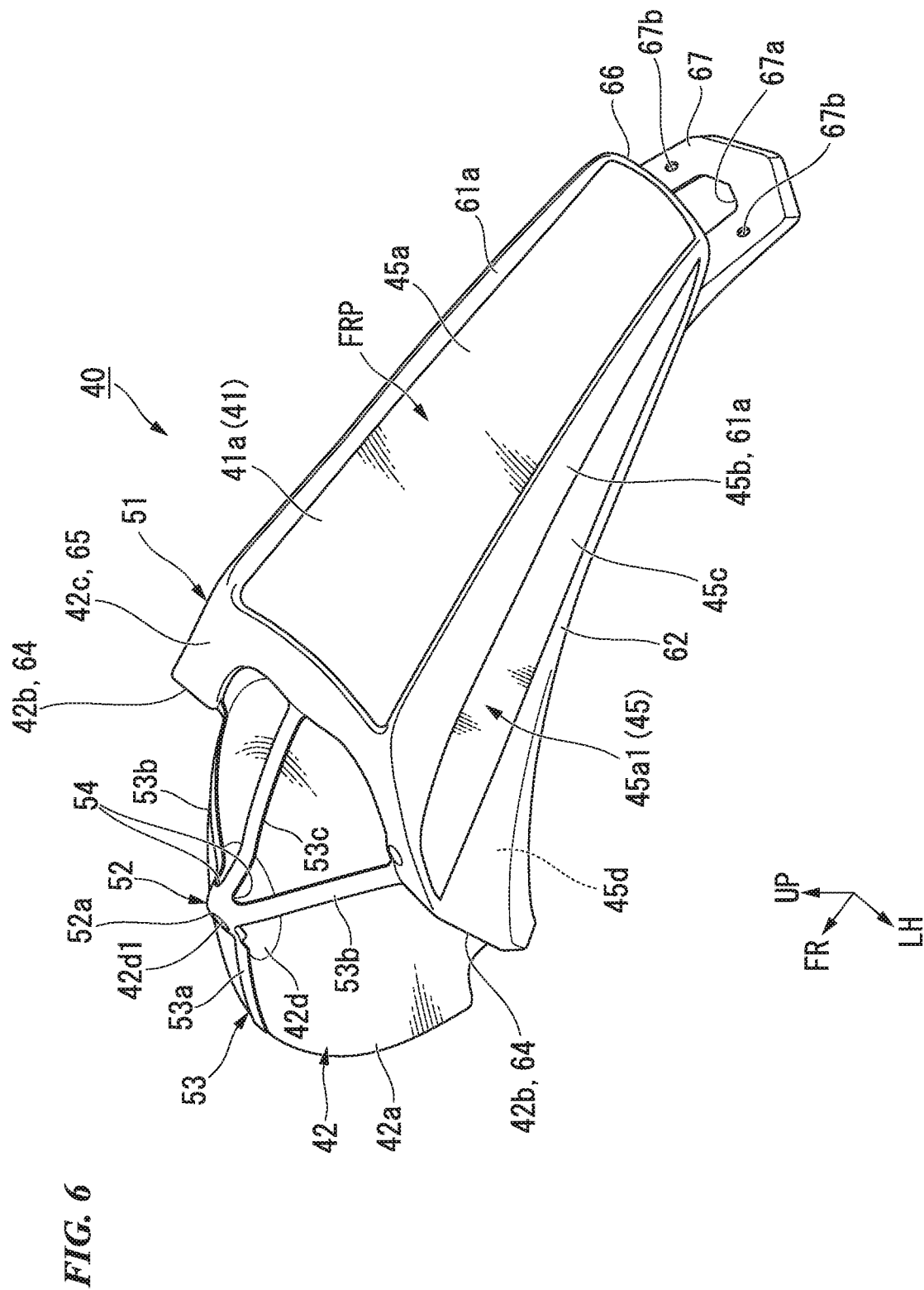
FIG. 6 is a perspective view of the rear fender when seen from an inclined rear upper side.
Figure 7:
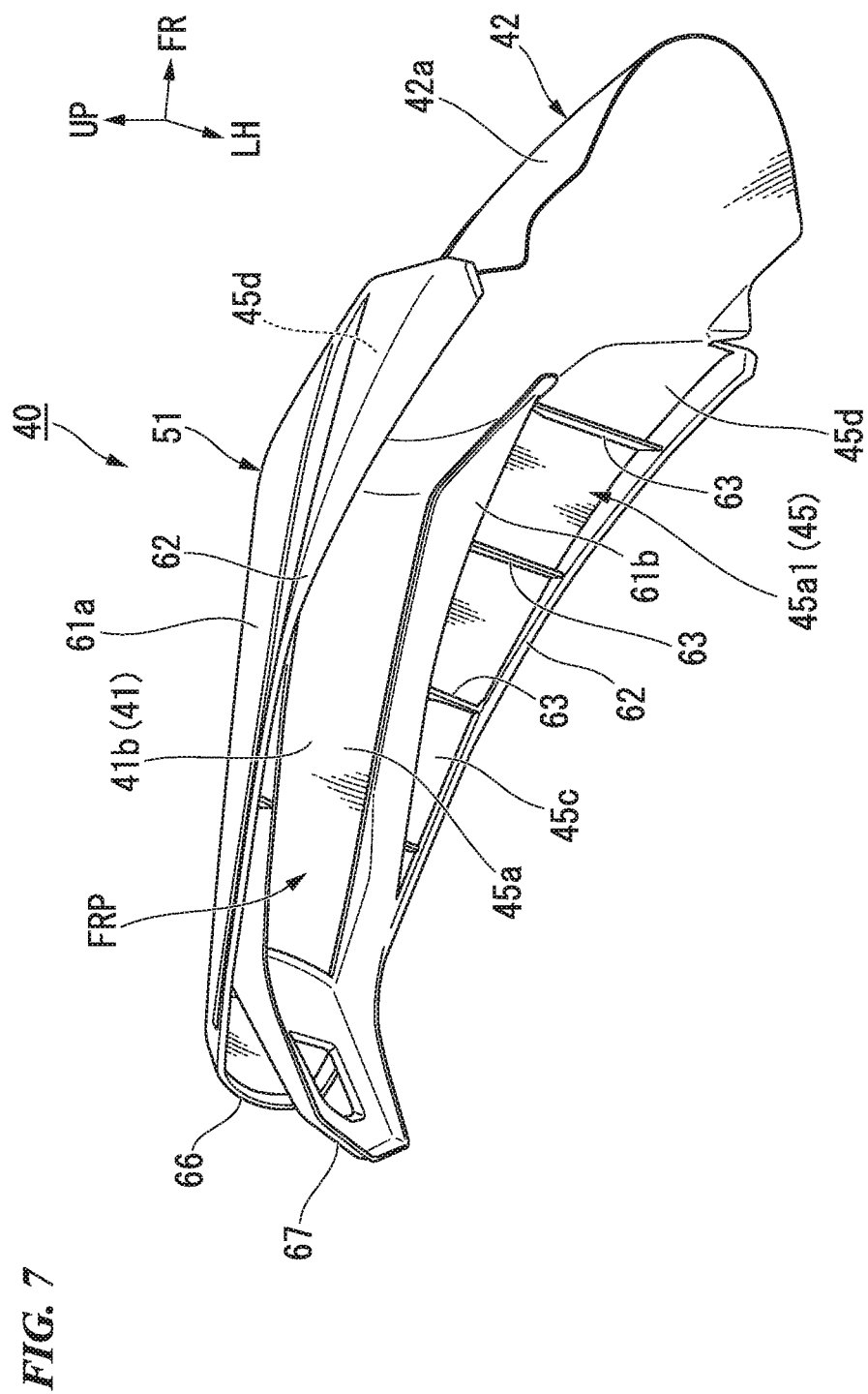
FIG. 7 is a perspective view of the rear fender when seen from an inclined rear lower side.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction in the vehicle, an arrow UP indicates an upward direction in the vehicle, and a line CL indicates a line showing a lateral center with respect to a vehicle body.

<Entire Vehicle>

As shown in FIG. 1, a saddle riding vehicle of the embodiment is an off-road type motorcycle 1. A front wheel 2 of the motorcycle 1 is supported by lower end portions of a pair of left and right front forks 3. Upper sections of the left and right front forks 3 are supported by a head pipe 6 of a front end portion of a vehicle body frame 5 via a steering stem 4. A bar type steering handle 7 is attached onto a top bridge 4a of the steering stem 4.

The vehicle body frame 5 has a front frame 5a formed of a metal such as an aluminum alloy or the like, and a rear frame 5b formed of a fiber-reinforced resin such as a carbon fiber-reinforced resin or the like. The rear frame 5b functions as a seat frame that supports a seat 33, and a front edge portion thereof is connected to a rear edge portion of the front frame 5a by a pair of front and rear fastening sections 5c.

The front frame 5a has the head pipe 6, a pair of left and right main tubes 8 extending rearward and downward from the head pipe 6, a pair of left and right pivot frames 9 configured to connect rear end portions of the left and right main tubes 8, a single down frame 11 extending rearward and downward from the head pipe 6 to form a steeper slope than that of the left and right main tubes 8, and a pair of left and right lower frames 12 branching off from a lower end portion of the down frame 11 into left and right sections and extending to be curved rearward, and connected to lower end portions of the left and right pivot frames 9.

A front end portion of a swing arm 15 is vertically swingably supported by the left and right pivot frames 9. A rear wheel 17 of the motorcycle 1 is supported by a rear end portion of the swing arm 15.

A lower end portion of a rear cushion unit 19 is connected to a front lower side of the swing arm 15 via a link mechanism (not shown). An upper end portion of the rear cushion unit 19 is connected to a cross member (not shown) that bridges between rear end portions of the left and right main tubes 8.

An engine 21 that is a prime mover of the motorcycle 1 is mounted on an inner side of the front frame 5a. The engine 21 is a water-cooling single cylinder engine having a crankshaft parallel to a vehicle width direction (a leftward and rightward direction), and a cylinder (not shown) stands upward from a front section of a crank case 22 formed on a lower section thereof. An intake system of the engine 21 is connected to a rear side of the cylinder, and an exhaust system of the engine 21 is connected to a front side of the cylinder. Reference numeral 27 in the drawings designates an exhaust pipe extending from the exhaust system toward a rear section of the vehicle body, and reference numeral 28 designates a silencer to which a downstream end of the exhaust pipe 27 is connected. An output shaft protrudes from a rear side of the crank case 22, and the output shaft and the rear wheel 17 are linked by a chain type transmission mechanism.

A front stay 34 protruding forward is fixed to a front section of the head pipe 6. A headlight 34a, a windscreen 34b, meters 34c, and so on, are supported by the front stay 34.

In the motorcycle 1, a pair of left and right front tanks 31 disposed to be divided into two sides in a vehicle body front section and a rear tank 32 installed inside of the rear frame 5b are provided as a fuel tank 30 of the engine 21. The left and right front tanks 31 are installed so as to be vertically bridging between the left and right main tubes 8 and have lower sections that cover sides of the engine 21, when seen in a side view.

A front end portion 33a of the seat 33 is disposed between rear sides of upper end portions of the left and right front tanks 31 so as to cover the front tanks 31 from above. An intake duct 26 configured to guide external air in a direction toward an air cleaner apparatus 25 from a front side with respect to the vehicle body is installed at inner sides of upper end portions of the left and right front tanks 31 in the vehicle width direction.

Reference numeral 35 in the drawings designates a front fender supported by a bottom bridge 4b of the steering stem 4, reference numeral 40 designates a rear fender extending from a rear side of the seat 33, reference numeral 29 designates a pair of left and right radiators disposed at both of left and right sides of the down frame 11, reference numeral 37 designates a pair of left and right shrouds disposed in front of the left and right front tanks 31 and configured to cover sides of the left and right radiators 29, and reference numeral 38 designates an undercover configured to cover a lower section of the vehicle body.

<Rear Fender>

Hereinafter, the rear fender 40 of the embodiment will be described in detail.

As shown in FIG. 2 to FIG. 8, the rear fender 40 has a fender main body 41 formed of a fiber-reinforced resin (polypropylene fiber-reinforced plastic: PPFRP) utilizing a resin fiber formed of, for example, polypropylene (PP). The PPFRP is formed by forming unit sheets by weaving stretchable resin fibers such as elongated polypropylene fibers (filament yarns), nylon, or the like, into plain fabric, twill fabric, satin weave, and so on, laminating the plurality of unit sheets, and solidifying the unit sheets using a resin (a matrix resin) such as epoxy, polypropylene, or the like.

Figure 8:
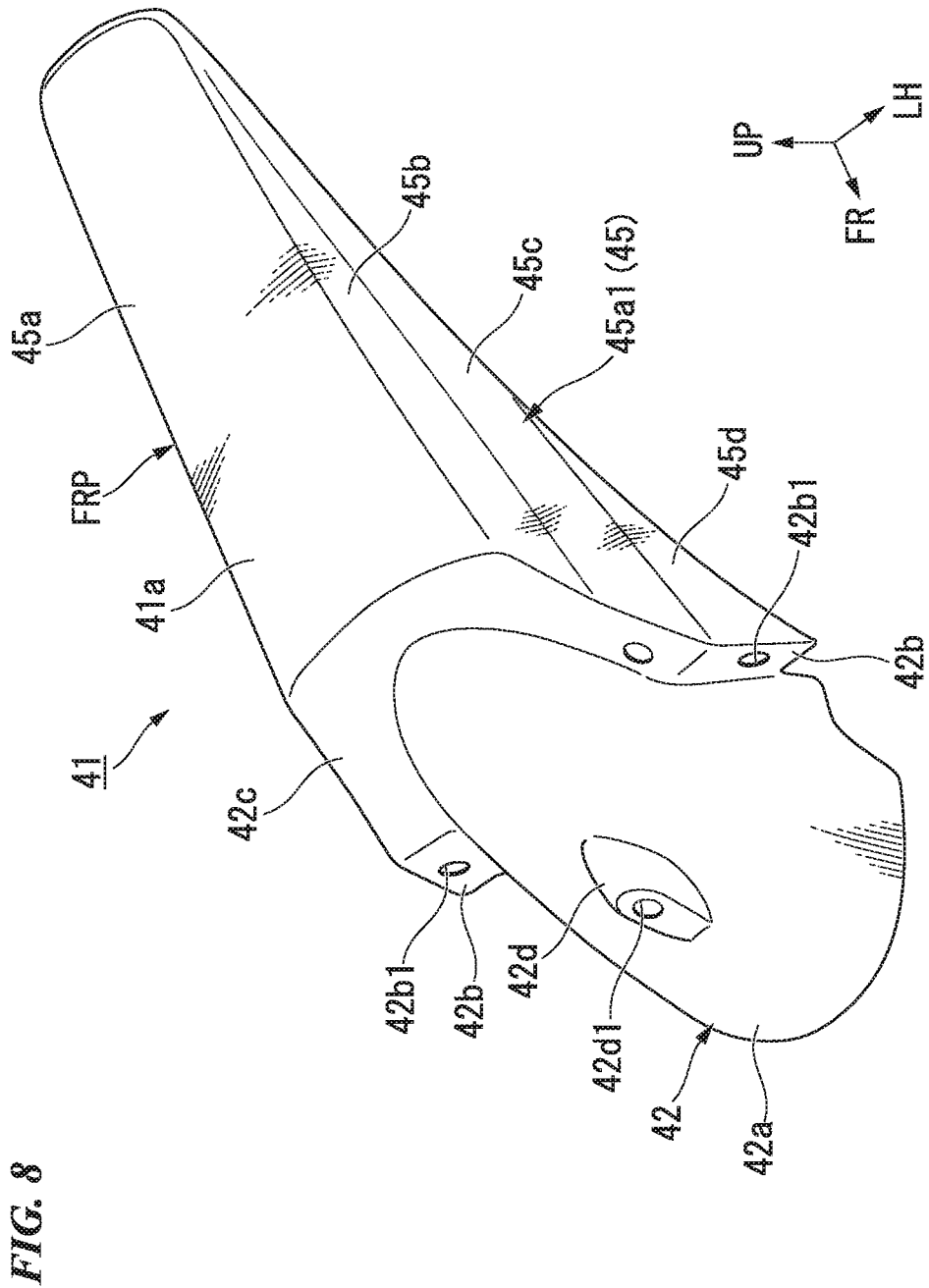
FIG. 8 is a perspective view of a fender main body.
Figure 9:
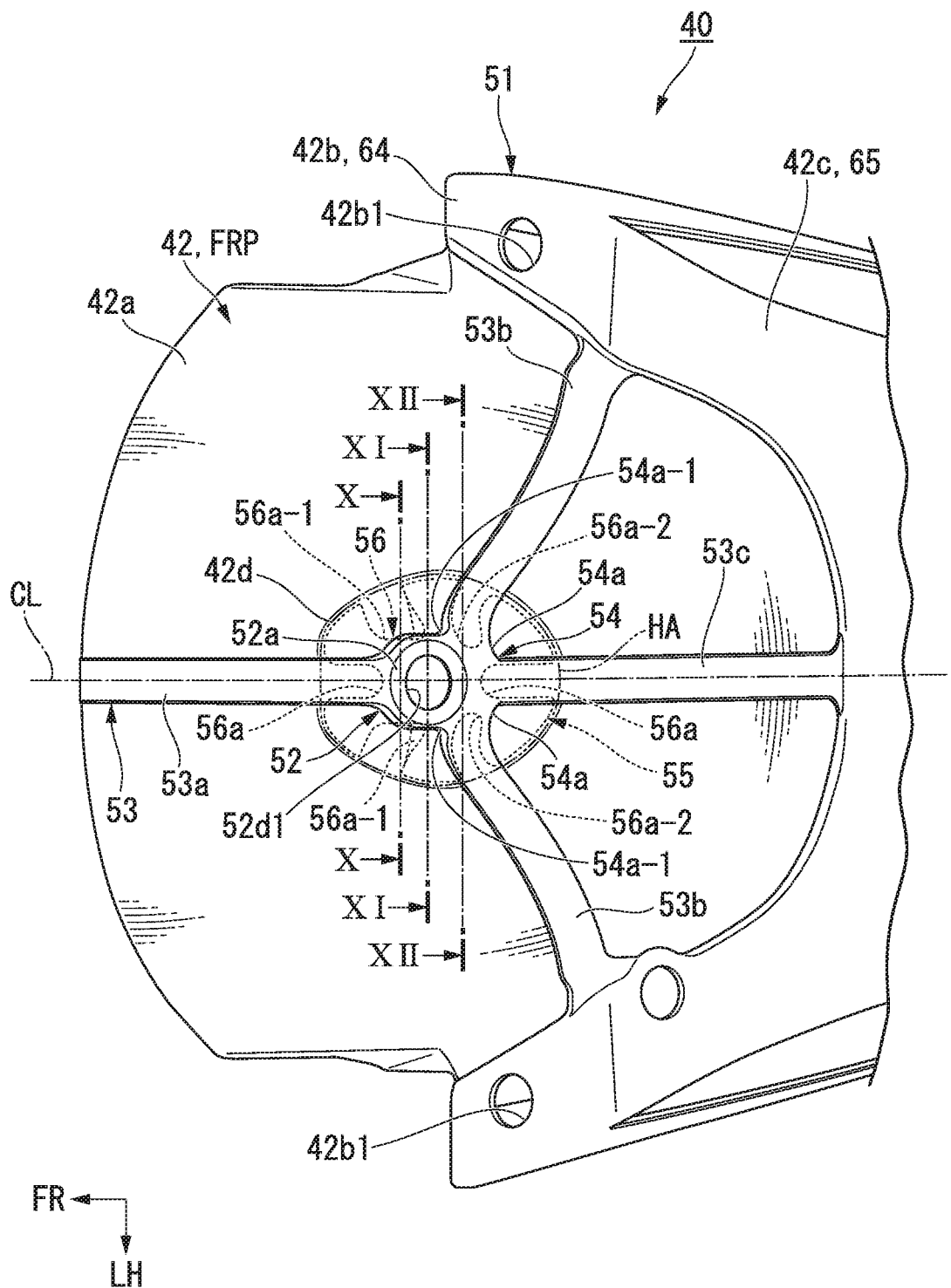
FIG. 9 is a plan view of surroundings of a fastening section of the rear fender.

The rear fender 40 is obtained by pressing sheet-shaped PPFRP while heating the sheet-shaped PPFRP and forming a rough overall form or the fender main body 41 (see FIG. 8). The fender main body 41 is configured as a thin plate member having a substantially uniform thickness. A resin structure section 51, which is formed of the same resin as the polypropylene fiber (in the embodiment, a polypropylene which is the identical resin) and which does not include a fiber, is integrally formed on an outer surface (a surface, a design surface) 41a and an inner surface (a back surface, a wheel-facing surface) 41b of the fender main body 41, and thereby, the rear fender 40 is formed. The "same resin" includes materials which melt into each other, when a resin fiber is a polypropylene, in addition to polypropylene that is the identical resin, an epoxy resin is included as an example.

In addition, if the fender main body 41 is configured of a fiber-reinforced resin (FRP) having a matrix resin that has a melting point lower than that of the resin fibers, at the time the fender main body 41 and the resin structure section 51 are formed integrally with each other, the matrix resin can be easily melted, and a bonding strength between the fender main body 41 and the resin structure section 51 can be further increased. For example, the fender main body 41 may be exemplified as a body in which polypropylene fibers are solidified with polyethylene serving as a matrix resin.

The rear fender 40 is subjected to injection molding of the resin structure section 51 after pressing the fender main body 41.

FIG. 13A to FIG. 13D are views for explaining a process of manufacturing the rear fender 40 in sequence of FIG. 13A to FIG. 13D. As shown in FIG. 13A to FIG. 13D, first, with respect to a mold M that forms a rear fender, a base member formed of a fiber-reinforced resin FRP that is flat (in the application, "FRP" is used as reference characters) is loaded to between a cavity mold Mca and a core mold Mco (FIG. 13A). Next, the cavity mold Mca and the core mold Mco are clamped and pressed against the fiber-reinforced resin FRP to perform press forming, and the fender main body 41 having a predetermined shape is formed in the mold M (FIG. 13B). In this state, a melted resin is pumped into injection spaces (cavities C) formed in the cavity mold Mca and the core mold Mco (FIG. 13C). The cavity mold Mca and the core mold Mco are separated from each other after the melted resin has solidified, and the rear fender 40 having the resin structure section 51 formed on an outer surface and an inner surface of the fender main body 41 is obtained (FIG. 13D). Further, the resin structure section 51 may be molded in a mold in which pressing forming is performed as described above, or may be molded through injection molding after the fender main body 41 is molded through pressing forming and then the fender main body 41 may be moved to a mold for injection molding.

Figure 14:
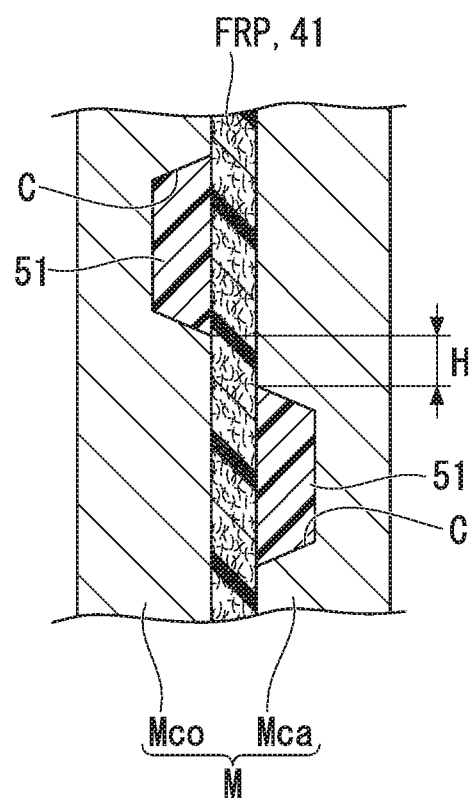
FIG. 14 is a view for explaining an operation when a resin structure section of the rear fender is molded.

As shown in FIG. 14, when the cavities C are arranged so as to deviate in a surface direction and are not facing each other in a thickness direction of the fiber-reinforced resin FRP, one surface side of the fiber-reinforced resin FRP disposed in this area is fixed to the mold M (pressed with the injected melted resin and comes into contact with the mold M). For this reason, a positional deviation of the fiber-reinforced resin FRP is minimized even when a pressure of the injected melted resin is received. In addition, even when the fiber-reinforced resin FRP is sandwiched between the molds M within a range H between the cavities C deviated from each other in the surface direction, a positional deviation of the fiber-reinforced resin FRP is minimized.

As shown in FIG. 2 to FIG. 8, the rear fender 40 is formed in a long shape elongated in the forward and rearward direction. The rear fender 40 includes a vehicle body attachment section 42 installed on a front section thereof, and an extension section 45 extending from the vehicle body attachment section 42 to a rear end portion thereof.

The vehicle body attachment section 42 includes a semi-spherical curved section 42a that avoids contact with the rear wheel 17, vertical surface sections 42b formed at both sides of the curved section 42a in the leftward and rightward direction so as to be perpendicular to the forward and rearward direction and fixed to a vehicle body side by a bolt or the like extending in the forward and rearward direction, and an inclined surface section 42c formed in a U shape to bridge between upper end portions of the left and right vertical surface sections 42b, extending to be inclined rearward and upward from an outer surface of the curved section 42a, and which comes into contact with a rear end portion of the seat 33 (see FIG. 1). A through-hole 42b1 through which a bolt or the like is inserted to attach a member to a vehicle body side is formed in the vertical surface sections 42b. A swelling section 42d protruding upward is formed at a substantially central portion of the curved section 42a. A through-hole (a fastening member insertion hole) 42d1 through which a bolt or the like extending in the forward and rearward direction is inserted is formed in the swelling section 42d.

A fastening section 52 that forms a seat surface for a bolt or the like is formed integrally with the surroundings of the through-hole 42d1. The fastening section 52 includes an outer fastening section 52a formed on the fender main body 41 at an outer side in the vehicle, an inner fastening section 52b formed on the fender main body 41 at an inner side in the vehicle, and a hole inner circumference forming section 52c formed along an inner circumferential edge portion of the through-hole 42d1. The outer fastening section 52a is formed around the through-hole 42d1 of the swelling section 42d on an outer surface side (an upper surface side) of the curved section 42a, and forms an annular seat surface. The inner fastening section 52b is formed around the through-hole 42d1 of the swelling section 42d on an inner surface side (a lower surface side) of the curved section 42a, and forms an annular seat surface.

Figure 11:
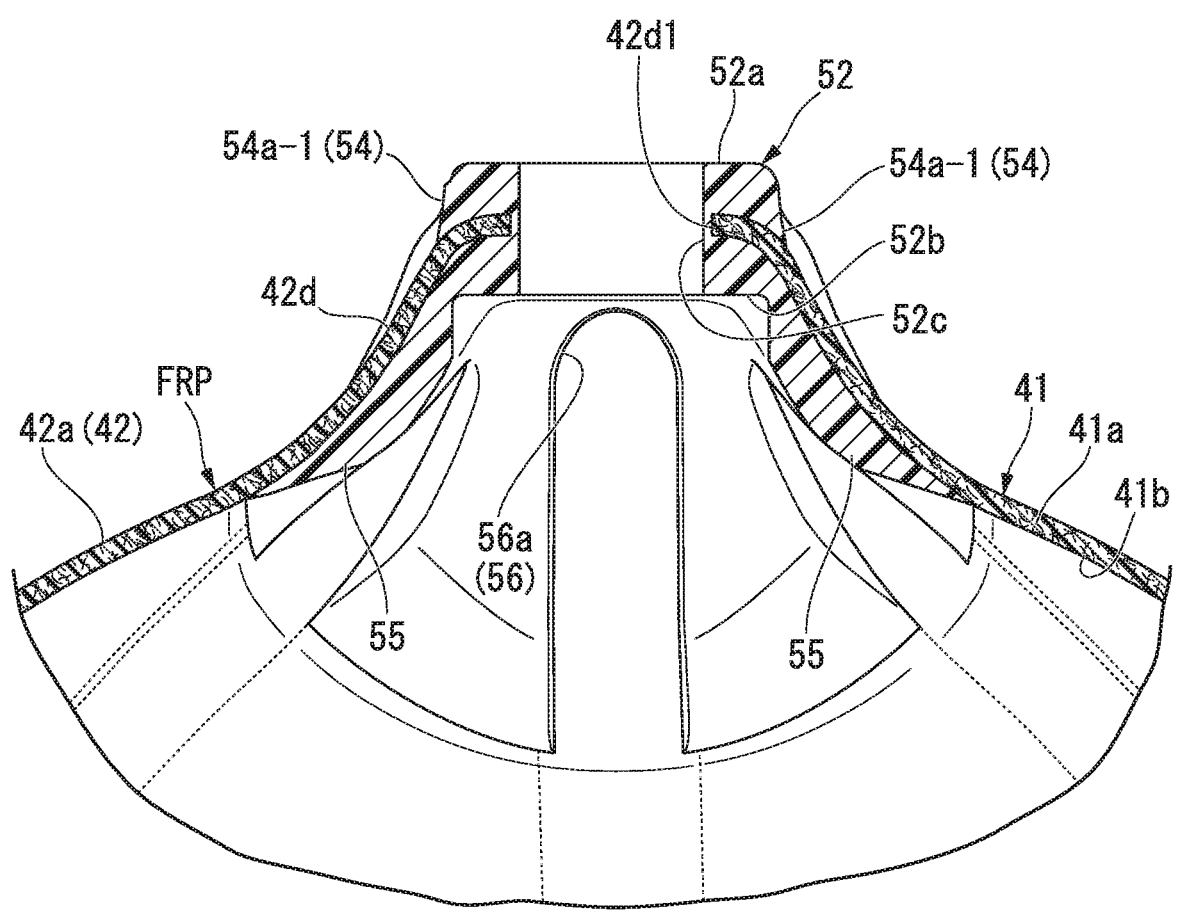
FIG. 11 is a cross-sectional view taken along line XI-XI in FIG. 9.

Referring to FIG. 11, the outer fastening section 52a and the inner fastening section 52b face each other with a part of the fender main body 41 sandwiched therebetween in the thickness direction of the fender main body 41. For this reason, by forming the inner fastening section 52b, since the outer fastening section 52a can be formed at a place of generation of sink marks (recesses generated on a surface according to contraction of the resin) that tends to occur on a surface opposite to the fender main body 41 in the thickness direction, a design can be improved because the sink marks cannot be easily seen. The outer fastening section 52a and the inner fastening section 52b are integrally continuous with each other via the hole inner circumference forming section 52c and cover an inner circumferential edge portion of the through-hole 42d1. Since an inner circumferential edge of the through-hole 42d1 of the fiber-reinforced resin FRP (the fender main body 41) is covered with the fastening section 52 that is the resin structure section 51 with no fiber, it is possible to omit a finishing treatment for removing exposure (split or scuffing) of fiber ends of the reinforcing fibers.

Referring to FIG. 2 to FIG. 8, an outer fastening support section 53, which is formed of the same resin material as the resin fiber and is formed integrally with the fender main body 41, is formed integrally with the fastening section 52 at surroundings of the fastening section 52 in the fender main body 41 at an outer side in the vehicle. The outer fastening support section 53 includes a plurality of reinforcement bead sections 53a to 53c, three of which extend rearward and one of which extends forward from the fastening section 52 substantially in a radial direction. Specifically, the reinforcement bead sections 53a to 53c include a front reinforcement bead section 53a extending forward from the fastening section 52, a front outer reinforcement bead section 53b extending diagonally forward from the fastening section 52, and a rear reinforcement bead section 53c extending rearward from the fastening section 52.

An inner fastening support section 55, which is formed of the same resin material as the resin fiber and is formed integrally with the fender main body 41, is formed integrally with the fastening section 52 at surroundings of the fastening section 52 in the fender main body 41 at an inner side in the vehicle. The inner fastening support section 55 is annularly formed to surround the through-hole 42d1 (the inner fastening section 52b) of the fiber-reinforced resin FRP.

Referring to FIG. 9 to FIG. 12, the outer fastening support section 53 and the inner fastening support section 55 include retracting sections 54 and 56 that avoid each other when seen in the thickness direction of the fender main body 41.

As the retracting section 54, the outer fastening support section 53 includes an outer cutout section 54a having a concave shape formed between the reinforcement bead sections 53a to 53c, which are neighboring in a circumferential direction of an annular range HA, at a surface side (an outer side in the vehicle) of the fender main body 41 in the annular range HA which is defined in an outer circumferential shape of the inner fastening support section 55.

The inner fastening support section 55 includes an inner cutout section 56a as the retracting section 56 on a back surface side (an inner side in the vehicle) of the fender main body 41 in the annular range HA defined by an outer circumferential shape thereof.

The retracting sections 54 and 56 of the outer fastening support section 53 and the inner fastening support section 55 are formed to be inclined along an outer surface and inner surface of the swelling section 42d, respectively.

A plurality of outer cutout sections 54a and a plurality of inner cutout sections 56a are provided.

The plurality of outer cutout sections 54a and the plurality of inner cutout sections 56a are disposed to be arranged alternately in the circumferential direction of the annular range HA when seen in the thickness direction of the fender main body 41. That is, the reinforcement bead sections 53a to 53c of the outer fastening support section 53 extend to avoid the inner fastening support section 55 at a position at which at least a part thereof overlaps the inner cutout section 56a when seen in the thickness direction of the fender main body 41.

Figure 10:
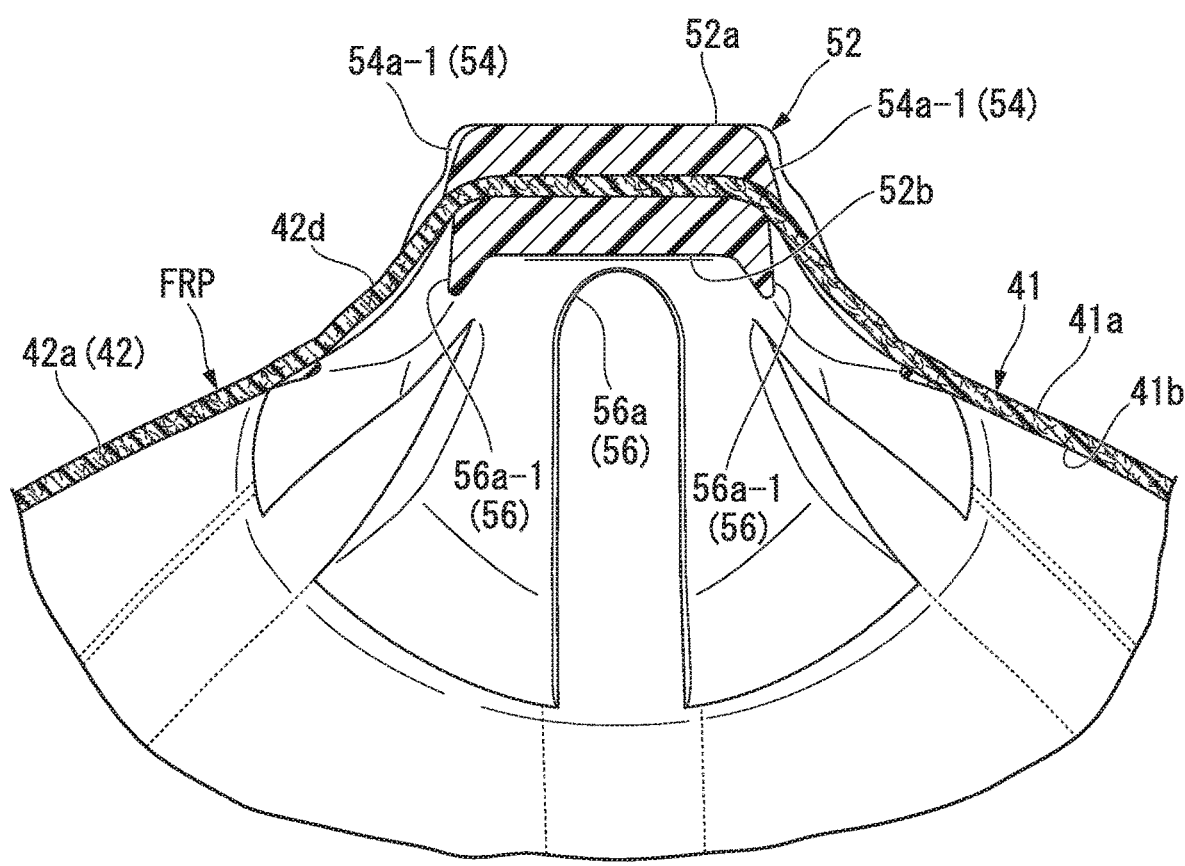
FIG. 10 is a cross-sectional view taken along line X-X in FIG. 9.

At a cross-sectional position shown in FIG. 10, since the outer cutout section 54a-1 and the inner cutout section 56a-1 overlap each other in the thickness direction of the fender main body 41, the outer fastening support section 53 and the inner fastening support section 55 avoid each other.

At a cross-sectional position shown FIG. 11, since the outer cutout section 54a-1 exists while the inner cutout section 56a-1 is missing, the outer fastening support section 53 and the inner fastening support section 55 avoid each other.

Figure 12:
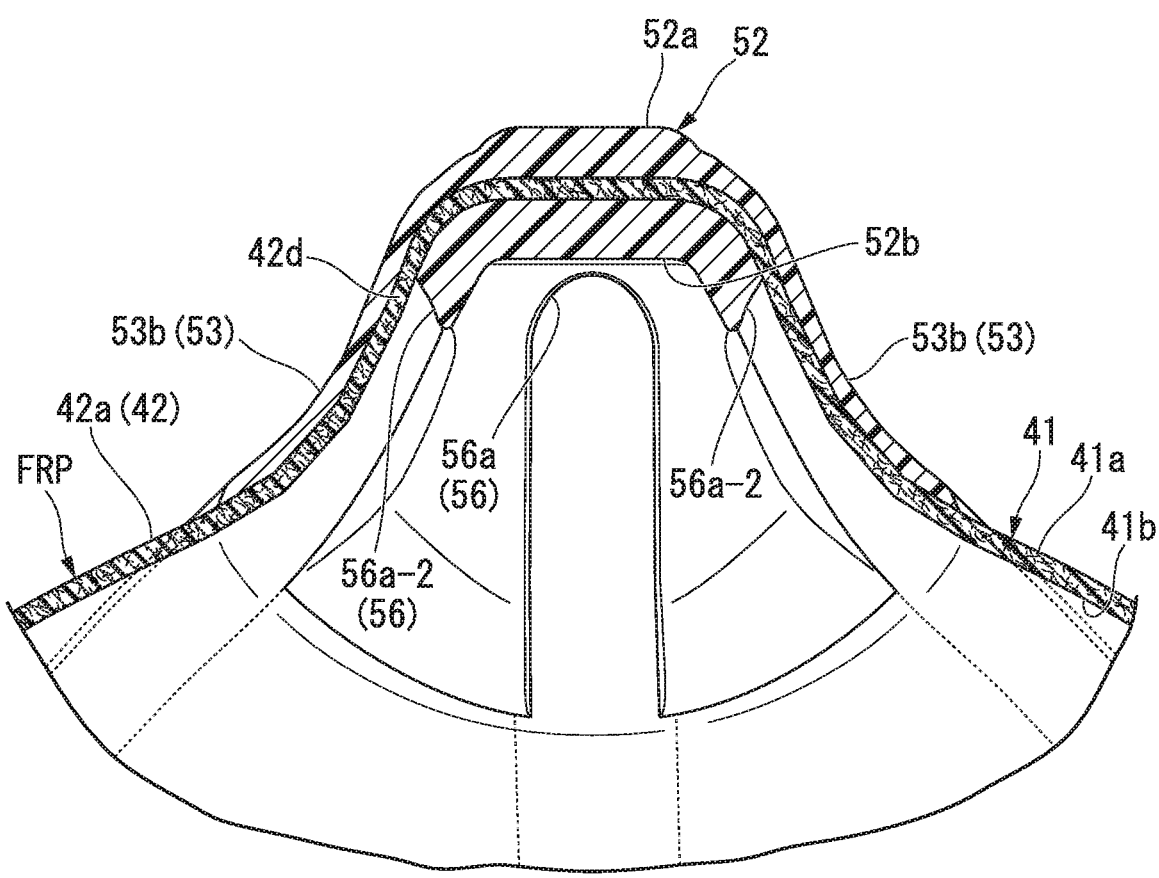
FIG. 12 is a cross-sectional view taken along line XII-XII in FIG. 9.

At a cross-sectional position shown in FIG. 12, since the inner cutout section 56a-2 exists while the outer cutout section 54a-1 is missing, the outer fastening support section 53 and the inner fastening support section 55 avoid each other.

Referring also to FIG. 14, when the inner and outer fastening support sections 53 and 55 are injection-molded, an injection space (a cavity C) is formed in only one side surface of the fiber-reinforced resin FRP in an area in which the inner and outer fastening support sections 53 and 55 in the mold M are formed. Then, as described above, since one side surface side of the fiber-reinforced resin FRP disposed in the area is fixed to the mold, a positional deviation of the fiber-reinforced resin FRP is minimized even when a pressure of the injected melted resin is received.

In addition, the fiber-reinforced resin FRP can be sandwiched between the molds in the range between the inner and outer cavities C disposed alternately. Accordingly, a positional deviation of the opening through which a fastening member formed on the fiber-reinforced resin FRP is inserted does not tend to occur, and molding accuracy (form accuracy) of the fastening section 52 is increased.

Regarding the outer fastening support section 53 and the inner fastening support section 55, the outer cutout section 54*a* and the inner cutout section 56*a* are formed in a substantially annular shape so as to surround the opening (the through-hole 42*d*1) formed in the fiber-reinforced resin FRP, and are, within in the substantially annular range HA, formed at positions facing each other while having the fiber-reinforced resin FRP in between.

Accordingly, since the fiber-reinforced resin FRP that constitutes the fender main body 41 is annularly fixed to the mold, a positional deviation of the opening (the through-hole 42*d*1) formed in the fender main body 41 (the fiber-reinforced resin FRP) cannot be easily generated and molding accuracy (form accuracy) is further increased, and further, since the fiber-reinforced resin FRP can be sandwiched between both of the molds by forming the cutout sections 54*a* and 56*a* around the opening (the through-hole 42*d*1), molding accuracy (form accuracy) of the opening (the through-hole 42*d*1) is further increased.

Further, the retracting sections 54 and 56 may be formed in only one of the outer fastening support section 53 and the inner fastening support section 55. Even in this case, an action of fixing one side surface of the fiber-reinforced resin FRP to the mold is obtained in an area in which the injection space (the cavity C) is formed in one side surface of the fiber-reinforced resin FRP.

Referring to FIG. 2 to FIG. 8, the extension section 45 includes a top plate section 45*a* formed on a substantially horizontal upper surface, and a pair of left and right side plate sections 45*a*1 extending downward from left and right outer sides of the top plate section 45*a*. The left and right side plate sections 45*a*1 include upper skirt sections 45*b* extending substantially vertically downward from left and right side edge portions of the top plate section 45*a*, side inclined sections 45*c* extending downward from lower edge portions of the upper skirt sections 45*b* and inclined toward left and right outer sides, and lower skirt sections 45*d* extending substantially vertically downward from lower edge portions of front sections of the side inclined sections 45*c*. The lower skirt section 45*d* has a triangular shape that is elongated in the forward and rearward direction when seen in a side view as the lower edge portion turns up rearward and upward. The front edge portions of the lower skirt sections 45*d* are connected to the outer edge portions of the vertical surface sections 42*b*.

The fiber-reinforced resin FRP that forms the rear fender 40 is configured by weaving fiber threads in two-directions having orientation directions perpendicular to each other. The fiber-reinforced resin FRP is disposed such that the orientation direction of the fiber threads is inclined by about 45 degrees (is not parallel to) with respect to the forward and rearward direction (a lengthwise direction of the extension section 45) in the extension section 45.

The extension section 45 oscillates and moves a rear end side up and down during traveling. The extension section 45 may receive a disturbance upon overturning or the like of the motorcycle 1, may be used as a handle configured to allow a user to support or pull the vehicle body, or may input loads in various directions. With respect to this, even when vertical vibration or load inputs in various directions are provided to the extension section 45, due to a contrivance of the fiber directions, stress occurring in the fiber-reinforced resin FRP is easily distributed, folding or whitening of the surface is minimized, and exfoliation of lamination of the resin layer is minimized.

The rear fender 40 includes the resin structure section 51 with no fiber, at each of the vehicle body attachment section 42 and the extension section 45. The resin structure section 51 is fused to and formed integrally with front and back surface sides of the fender main body 41 formed of the fiber-reinforced resin FRP. Hereinafter, the front surface of the fender main body 41 is referred to as the outer surface 41*a* directed toward an outer side in the vehicle, and the back surface of the fender main body 41 is referred to as the inner surface 41*b* directed toward an inner side in the vehicle.

The resin structure section 51 includes a plurality of longitudinal ribs (reinforcement sections) 61*a* and 61*b* and molded sections (reinforcement sections) 62 extending in the forward and rearward direction, a plurality of lateral ribs 63 extending in the vehicle width direction, a pair of left and right vertical surface covering sections 64 configured to cover outer surface sides (front surface sides) of the left and right vertical surface sections 42*b*, an inclined surface covering section 65 configured to cover an outer surface side (an upper front surface side) of the inclined surface section 42*c*, a rear molded section 66 configured to cover a rear edge portion of the fender main body 41, a license plate attachment section (a part attachment section) 67 extending from a rear lower side of the fender main body 41 to an inclined lower rear side, and the fastening section 52. The license plate attachment section 67 includes a central opening 67*a* for reduction in weight, and a pair of left and right through-holes 67*b* disposed at left and right sides of the central opening 67*a*. The through-holes 67*b* are fastening holes through which bolts or the like configured to fasten a license plate are inserted. Since the through-holes 67*b* are formed in the resin structure section 51 with no fiber thread, splitting and scuffing of the fiber thread upon attachment and detachment of the license plate are minimized.

The longitudinal ribs 61*a* and 61*b* include an outer longitudinal rib 61*a* extending in the forward and rearward direction along a boundary portion between the top plate section 45*a* and the left and right side plate sections 45*a*1 on an outer surface side of the extension section 45, and an inner longitudinal rib 61*b* extending in the forward and rearward direction along a boundary portion between the top plate section 45*a* and the left and right side plate sections 45*a*1 on an inner surface side of the extension section 45. The outer longitudinal rib 61*a* and the inner longitudinal rib 61*b* allow base end portions thereof to face each other in the thickness direction of the fender main body 41 and sandwich the fender main body 41 (the fiber-reinforced resin FRP) between the base end portions. For this reason, since the outer longitudinal rib 61*a* can be formed at a place of generation of sink marks (recesses generated on a surface according to contraction of the resin) that can easily occur on a surface opposite to the fender main body 41 in the thickness direction by forming the inner longitudinal rib 61*b*, a design can be improved because the sink marks cannot be easily seen.

The molded sections 62 extend in the forward and rearward direction along the lower edge portion of the extension section 45 and cover the lower edge portion of the extension section 45. Since the lower edge portion of the extension section 45 is covered with the molded sections 62 formed of a resin with no fiber, when an occupant, a mechanic, or the like, grips the extension section 45, a load applied to his/her hand is reduced. The molded sections 62 also cover the outer surface of the lower skirt section 45*d*.

The rear end portion of the extension section 45 is covered with the rear molded section 66 extending in the leftward and rightward direction along the rear end portion. Since an edge of the fiber-reinforced resin FRP (the fender main body 41) is covered with the molded sections 62 and 66, it is possible to omit a finishing treatment for removing exposed (split or scuffed) fiber ends of the reinforcing fibers.

The longitudinal ribs 61a and 61b and the molded sections 62 extend to the rear end portion of the extension section 45. The rear end portions of the left and right longitudinal ribs 61a and 61b and the molded sections 62 are connected to both end portions of the rear molded section 66. Rear sections of the left and right molded sections 62 are connected to both sides of the upper end portion of the license plate attachment section 67. The front end portions of the longitudinal ribs 61a and 61b and the molded sections 62 are connected to both end portions of the inclined surface covering section 65 and the left and right vertical surface covering sections 64. Since the resin structure section 51 is appropriately connected to the extension section 45 in the forward and rearward direction, a flow of the melted resin upon injection molding of the resin structure section 51 becomes good.

The longitudinal ribs 61a and 61b and the molded sections 62 are formed such that a protrusion height from the fender main body 41 is reduced toward a rear side (a tip side) of the extension section 45 (i.e., a protrusion height from the fender main body 41 is increased toward a front side (a base end side)). For this reason, strength and rigidity is efficiently secured by the longitudinal ribs 61a and 61b and the molded sections 62 with respect to vibration or load input of the extension section 45 that forms an aspect of a cantilever beam.

The lateral ribs 63 have plate shapes substantially perpendicular to each other in the forward and rearward direction and are formed to connect the inner longitudinal rib 61b and the molded sections 62 to each other. The plurality of lateral ribs 63 are formed in the lengthwise direction (the forward and rearward direction) of the inner longitudinal rib 61b and the molded sections 62. The plurality of lateral ribs 63 function as joints between the inner longitudinal rib 61b and the molded sections 62 and increase rigidity of side portions of the rear fender 40.

In the rear fender 40 (the resin part for a vehicle) of the embodiment, the fender main body 41 is formed of the fiber-reinforced resin FRP, and the resin structure section 51 is provided on the outer surface 41a of the fender main body 41 as a partial reinforcement. Since the fiber-reinforced resin FRP is used for the fender main body 41, the rear fender 40 that is thin and light can be obtained. Since the resin structure section 51 is provided as reinforcement only in an area required with respect to a rigidity of the fender main body 41, the fender main body 41 that is light can be efficiently reinforced. For this reason, the rear fender 40 having high rigidity can be obtained while minimizing a material cost. The fender main body 41 and the resin structure section 51 can each have a color due to material dope-dyeing, and it is possible to set a color variation of exterior parts.

While it is difficult to form a fine concavo-convex shape on the fender main body 41 formed of a sheet of the fiber-reinforced resin FRP, since the resin structure section 51 formed of the same material as the fiber thread is formed integrally with the fender main body 41, a fine shape of the resin structure section 51 fused to and strongly integrated with the fiber thread can be accurately formed with a high degree of freedom. Accordingly, a design shape due to the resin structure section 51 can be formed on a front surface side of the fender main body 41.

Since a protrusion height of the longitudinal ribs 61a and 61b from the fender main body 41 is increased toward a base end side (a front side) of the rear fender 40, rigidity with respect to oscillation or load input of the rear fender 40 can be efficiently increased. Since the longitudinal ribs 61a and 61b reach the rear end of the rear fender 40, in comparison with the case in which the longitudinal ribs 61a and 61b are terminated in the middle of the rear fender 40, generation of stress concentration due to oscillation or load input of the rear fender 40 can be minimized Since the edge portion of the rear fender 40 is covered with the molded sections 62 and 66, splitting or scuffing of the fiber threads in the lower edge portion of the fender main body 41 can be minimized Since rear end portions of left and right vertical ribs are connected by the rear molded section 66 that covers the rear end portion of the rear fender 40, a flow path of a melted resin upon injection molding can be secured to increase formability on rear end sides of the longitudinal ribs 61a and 61b having a tapered shape while minimizing splitting or scuffing of the fiber threads in the rear edge portion of the rear fender 40.

Since the plurality of longitudinal ribs are formed between the longitudinal rib 61b and the molded sections 62, the plurality of longitudinal ribs becomes joints that bridge between the longitudinal rib 61b and the molded sections 62, all of the side plate sections 45a1 are efficiently reinforced while minimizing an increase in weight, and thus, the entire rear fender 40 can be efficiently reinforced. Since the longitudinal ribs 61a and 61b face each other in the thickness direction of the fender main body 41, the inner and outer longitudinal ribs 61a and 61b reinforce each other, and rigidity of the rear fender 40 can be effectively increased. For this reason, since the outer longitudinal rib 61a can be formed at a place of generation of sink marks (recesses generated on a surface according to contraction of the resin) that can easily occur on a surface opposite to the fender main body 41 in the thickness direction by forming the inner longitudinal rib 61b, a design can be improved because the sink marks cannot be easily seen.

Since the front end portions of the longitudinal ribs 61a and 61b and the molded sections 62 are connected to the covering section that covers the inclined surface section 42c and the vertical surface sections 42b having a step difference shape of the fender main body 41, the longitudinal ribs 61a and 61b and the molded sections 62 can be connected to a high rigidity area of the fender main body 41 having the step difference shape and the covering section, and rigidity of the rear fender 40 can be effectively increased. Since the fastening section 52 that forms a fastened seat surface of the vehicle body attachment section 42 is formed of a resin with no fiber thread, splitting or scuffing of the fiber threads upon attachment and detachment of the rear fender 40 can be minimized Since a thickness of a layer including the fiber threads in the fastening section 52 is minimized, it is possible to prevent the layer including the fiber thread from being thinned due to aged deterioration, and rattling or the like from occurring in the vehicle body attachment section 42.

As described above, the resin part for a vehicle (the rear fender 40) of the embodiment includes the fender main body 41 formed of the fiber-reinforced resin FRP using the resin fiber, and the resin structure section 51 formed of the same resin material as the resin fiber, provided on the outer surface 41a exposed to at least the fender main body 41 at an outer side in the vehicle and formed integrally with the fender main body 41.

According to this configuration, since the reinforcing fiber included in the fender main body 41 and the resin material of the resin structure section 51 formed integrally with the fender main body 41 are the same material as each other, in comparison with the case in which they are formed of different materials, a strength of bonding of the resin structure section 51 to the fender main body 41 can be increased. In addition, since the fender main body 41 serving as a matrix is configured using the fiber material formed of a resin, in comparison with the case in which a conventional fiber material formed of carbon or the like is used, the matrix can be easily deflected even while high rigidity is obtained, and a protective function that enables shock absorption can be provided. In addition, since the resin structure section 51 is provided on the outer surface 41a exposed to an outer side with respect to the vehicle, the resin structure section 51 can also be used as a design to increase designability.

In addition, in the resin part for a vehicle, the fender main body 41 is constituted by the fiber-reinforced resin FRP having a matrix resin that has a melting point that is lower than that of the resin fiber.

According to this configuration, since the fender main body 41 has the matrix resin having a melting point that is lower than that of the resin fiber, the matrix resin can be easily melted upon joining to the resin structure section 51, and a strength of bonding can be increased.

In addition, in the resin part for a vehicle, the resin structure section 51 is formed to protrude from the outer surface 41a of the fender main body 41 toward an outer side with respect to the vehicle.

According to this configuration, since the resin structure section 51 is formed to protrude outward from the fender main body 41, a degree of freedom on design of the resin part can be increased while improving rigidity of the resin part. That is, since exfoliation of the resin structure section 51 is minimized by a strength of bonding between the resin materials, the resin structure section 51 serving as a design can also be provided on the outer surface 41a that can be easily affected by a disturbance, and a new design including the resin structure section 51 can be obtained.

In addition, in the resin part for a vehicle, the resin structure section 51 includes the reinforcement sections (the longitudinal ribs 61a and 61b and the molded sections 62) extending in directions crossing orientation directions of the resin fibers of the fender main body 41.

According to this configuration, since the reinforcement section extending to supplement anisotropy of the resin fibers is provided, rigidity of the resin part can be improved without increasing the number of laminated fiber sheets. When press forming the fender main body 41, in comparison with the case in which the number of laminated fiber sheets is increased, uniform heating of hot pressing can be easily performed, and formability can be increased.

In addition, in the resin part for a vehicle, the reinforcement section extends from the vehicle body attachment section 42 of the fender main body 41 to an end portion opposite to the vehicle body attachment section 42, and a protrusion height from the fender main body 41 is gradually reduced toward the end portion when seen in a side view.

According to this configuration, since the reinforcement section extends from the vehicle body attachment section 42 of the fender main body 41 to the end portion opposite to the vehicle body attachment section 42, in comparison with the case in which the reinforcement section is terminated halfway, occurrence of stress concentration at a terminal position of the reinforcement section can be minimized Rigidity can be secured by the protrusion height of the reinforcement section on a base end side (the vehicle body attachment section 42 side) at which stress tends to occur, and reduction in weight can be achieved by lowering the reinforcement section at an end side at which stress does not tend to occur in comparison with the base end side.

In addition, in the resin part for a vehicle, the resin structure section 51 includes an outer reinforcement section (the outer longitudinal rib 61a) formed to protrude from the fender main body 41 toward an outer side with respect to the vehicle and an inner reinforcement section (the inner longitudinal rib 61b) formed to protrude from the fender main body 41 toward an inner side with respect to the vehicle, and the outer reinforcement section and the inner reinforcement section are formed to face each other with a part of the fender main body 41 interposed therebetween in the thickness direction of the fender main body 41.

According to this configuration, when the inner and outer reinforcement sections are injection-molded, since the fiber-reinforced resin FRP cannot easily become a resistance upon injection of a melted resin at an area in which the inner and outer reinforcement sections in the mold M are formed, molding of the resin structure section 51 is facilitated, molding can be performed by lowering an injection pressure, and manufacturing costs can be minimized.

Further, since the resin structure section 51 and the resin fiber are formed of the same material and an influence on rigidity of the rear fender 40 is small even when a positional deviation of the fiber-reinforced resin FRP interposed between the injection spaces in the thickness direction occurs, positional accuracy of the fiber-reinforced resin FRP in the thickness direction may not be required to a great extent.

In addition, in the resin part for a vehicle, the part attachment section (the license plate attachment section 67) formed of the same resin material as the resin fiber and continuous with the resin structure section 51 so as to be formed integrally with the fender main body 41 is provided.

According to this configuration, as the part attachment section is formed integrally with the resin structure section 51, since the part attachment section is provided with no fiber while the part attachment section is easily molded, it is possible to prevent the resin fiber from hindering attachment of parts while improving an appearance without exposing the fibers even when an influence or the like of attachment of the parts and disturbance is received.

Further, the present invention is not limited to the embodiment, and for example, the resin fiber-reinforced resin is not limited to polypropylene fiber-reinforced plastic and may use a resin fiber such as a cellulose fiber, an aramid fiber, or the like, in addition to polypropylene.

The resin part for a vehicle to which the present invention is applied is not limited to the rear fender and may be other exterior parts such as a front fender, a shroud, or the like, or further, may be a functional part such as an air cleaner box or the like.

All vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included. In addition, the present invention is not limited to the saddle riding vehicle and may be applied to a vehicle having a passenger compartment.

Figure 15:
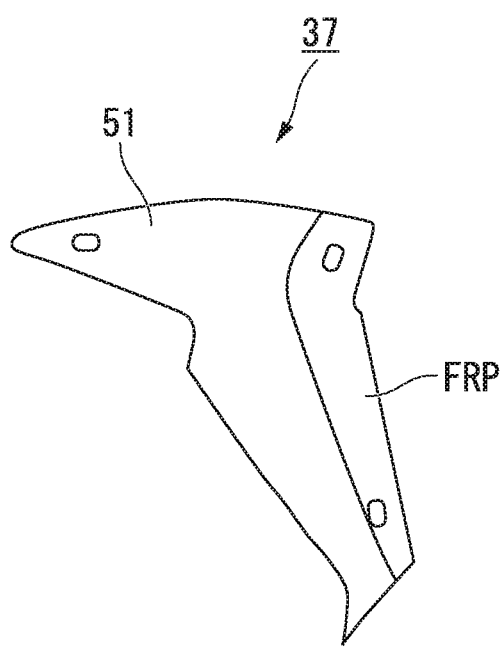
FIG. 15 is a side view showing an application example of the present invention.

FIG. 15 shows an example in which the present invention is applied to a shroud 37. In the example, the resin structure section 51 is not the reinforcement section of the fiber-reinforced resin FRP and used as an exterior component of the resin part. That is, since the resin fiber can have colors provided through material dope-dyeing in comparison with a carbon fiber or a glass fiber, for example, a design surface can be constituted by the resin structure section 51, which has a color obtained through material dope-dyeing, and the resin part main body, which is formed of the fiber-reinforced resin FRP, by integrally forming the resin structure section 51 and the resin part main body while arranging (continuous) them on the outer surface end portion of the fender main body 41 without protruding the resin structure section 51 from the outer surface, and exterior parts having rich color variation and high rigidity (bonding strength) can be provided.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A resin part for a vehicle comprising:
    a resin part main body formed of a fiber-reinforced resin using a resin fiber; and
    a resin structure section formed of the same resin material as the resin fiber, provided at least on an outer surface of the resin part main body exposed on an outer side with respect to a vehicle, and formed integrally with the resin part main body,
    wherein the resin structure section comprises a reinforcement section extending in a direction crossing with respect to an orientation direction of the resin fiber of the resin part main body, and
    wherein the reinforcement section extends from a vehicle body attachment section of the resin part main body to an end portion opposite to the vehicle body attachment section, and a protrusion height of the reinforcement section from the resin part main body is gradually reduced toward the end portion when seen in a side view.

2. The resin part for a vehicle according to claim 1, wherein the resin part main body is formed of the fiber-reinforced resin having a matrix resin that has a melting point lower than that of the resin fiber.

3. The resin part for a vehicle according to claim 1, wherein the resin structure section is formed to protrude from the outer surface of the resin part main body toward the outer side with respect to the vehicle.

4. The resin part for a vehicle according to claim 1, wherein the resin structure section comprises an outer reinforcement section formed to protrude from the resin part main body toward the outer side with respect to the vehicle, and an inner reinforcement section formed to protrude from the resin part main body toward an inner side with respect to the vehicle, and
    the outer reinforcement section and the inner reinforcement section are formed so as to face each other with a part of the resin part main body being interposed therebetween in a thickness direction of the resin part main body.

5. The resin part for a vehicle according to claim 1, comprising a part attachment section formed of the same resin material as the resin fiber, continuous with the resin structure section and formed integrally with the resin part main body.

* * * * *